(12) United States Patent
Kilmer

(10) Patent No.: US 6,564,673 B1
(45) Date of Patent: May 20, 2003

(54) BICYCLE HANDLEBAR WITH ARM AND HEAD SUPPORT

(76) Inventor: George M. Kilmer, 4265 N. Wilshire Dr., Marion, IN (US) 46952-8609

( * ) Notice: Subject to any disclaimer, the term of this patent is extended or adjusted under 35 U.S.C. 154(b) by 0 days.

(21) Appl. No.: 09/680,785

(22) Filed: Oct. 6, 2000

(51) Int. Cl.[7] .............................................. B62K 21/12
(52) U.S. Cl. ..................................... 74/551.8; 74/551.1
(58) Field of Search ........................... 74/551.1, 551.2, 74/551.3, 551.8

(56) References Cited

U.S. PATENT DOCUMENTS

| | | | |
|---|---|---|---|
| 1,961,244 A | | 6/1934 | Pottern |
| 3,760,905 A | * | 9/1973 | Dower ........................... 185/2 |
| 4,750,754 A | * | 6/1988 | Lennon ........................ 280/261 |
| 4,951,525 A | * | 8/1990 | Barromeo .................... 74/551.1 |
| 5,154,094 A | * | 10/1992 | Klieber ....................... 74/551.1 |
| 5,195,394 A | * | 3/1993 | Latta ........................... 74/551.8 |
| 5,235,872 A | * | 8/1993 | Giard, Jr. ..................... 74/551.8 |
| 5,265,496 A | * | 11/1993 | Townsend ................... 74/551.8 |
| 5,324,059 A | | 6/1994 | Bryne |
| 6,003,405 A | * | 12/1999 | Giard .......................... 74/551.3 |
| 6,089,515 A | | 7/2000 | McGlew |
| 6,098,493 A | * | 8/2000 | Cortes ......................... 74/551.8 |
| 6,234,043 B1 | * | 5/2001 | Marshall ..................... 74/551.8 |

FOREIGN PATENT DOCUMENTS

| | | | | |
|---|---|---|---|---|
| DE | 4100123 | * | 7/1992 | ............... B62J/1/16 |
| FR | 2668745 | * | 5/1992 | ............ B62K/21/12 |
| FR | 2671323 | * | 7/1992 | ............ B62K/21/12 |
| JP | 9150763 | * | 6/1997 | ............... B62J/1/28 |

* cited by examiner

Primary Examiner—David A. Bucci
Assistant Examiner—Vicky A Johnson
(74) Attorney, Agent, or Firm—Woodard, Emhardt, Naughton, Moriarty & McNett LLP

(57) ABSTRACT

A bicycle handlebar for supporting the head, forearms and elbows of the bicyclist. Pairs of handlebars are mounted to the steering stem. The lowest pair of handlebars extends horizontally for gripping when the bicyclist is in an erect position. The upper set of bars are mounted to the stem and extend curvingly outward and then upward to receive the forearms when the bicyclist bends forward. An intermediate set of bars may be located between the upper bars and lower bars receive the elbows of the bicyclist when the bicyclist leans forward.

17 Claims, 3 Drawing Sheets

BICYCLE HANDLEBAR WITH ARM AND HEAD SUPPORT

BACKGROUND OF THE INVENTION

The present invention relates generally to the field of bicycles.

DESCRIPTION OF THE PRIOR ART

In order to maximize the comfort and safety of the bicyclist, it is desirable to provide a bicycle construction to accommodate the various positions of the bicyclist upon the bicycle. For example, the bicyclist may assume an erect position or may bend forwardly to reduce air resistance when racing or bicycling at a fast pace. Likewise, when riding long distances, the bicyclist may want to change the position of his or her hands relative to the handlebars. The hands may be spread apart a great distance on the handlebars when negotiating difficult terrain or when in traffic whereas the hands may be placed relatively close together on the handlebars when traversing relatively flat terrain without traffic. In order to apply maximum pressure to the pedals, it is desirable that the bicyclist grip the handlebars in a location to exercise maximum force. Disclosed is a bicycle construction including a handlebar design allowing the bicyclist to grip the handlebar in four completely different positions.

U.S. Pat. No. 5,324,059 issued to Bryne discloses an aerodynamic bicycle with a handlebar construction having shelves for receiving the forearms and elbows of the bicyclist when in a racing position. Further, a shield fitted to the handlebar provides an edge against which the bicyclist may rest his or her helmet when in a racing position. Another type of bicycle head support is disclosed in U.S. Pat. No. 6,089,515 issued to McGlew which has an upwardly extending chin rest mountable to the handlebars. Another construction for a headrest for purposes of supporting the head during a shampoo is disclosed in U.S. Pat. No. 1,961,244 issued to Pottern.

SUMMARY OF THE INVENTION

One embodiment of the present invention incorporates two handlebars, one of which is curvaceous. After curving forward, the ends of this bar extend upwardly to receive the forearms of the bicyclist when in a forward leaning position. The top side of this bar adjacent to the stem and extending straight to the curve is covered by resilient cushioning material to receive the elbows or hands of the bicyclist. A second bar similar to handlebars on so called mountain or all terrain bicycles is attached firmly to the curvaceous upper bar with worm gear clamps. Only the upper bar incorporates a head rest.

It is an object of the present invention to provide a new and improved handlebar construction allowing for a variety of different gripping positions by the bicyclist.

A further object of the present invention is to provide a handlebar construction having a portion thereof for gripping while hill climbing thereby allowing for the application of maximum force to the pedal.

A further object of the present invention is to provide a bicycle handlebar construction having a rearwardly projecting headrest for receiving the chin of the bicyclist.

An additional object of the present invention is to provide a bicycle handlebar construction having a cushioned portion upon which the elbows may rest when the bicyclist is in a racing position or the hands may rest when in a more upright position.

In addition to the prior objects, it is also desirable to provide a handlebar construction allowing for gripping when mounting the bicycle and for use in conditions requiring more stability.

Related objects and advantages of the present invention will be apparent from the following description.

DESCRIPTION OF THE PREFERRED EMBODIMENT

Figure 1:
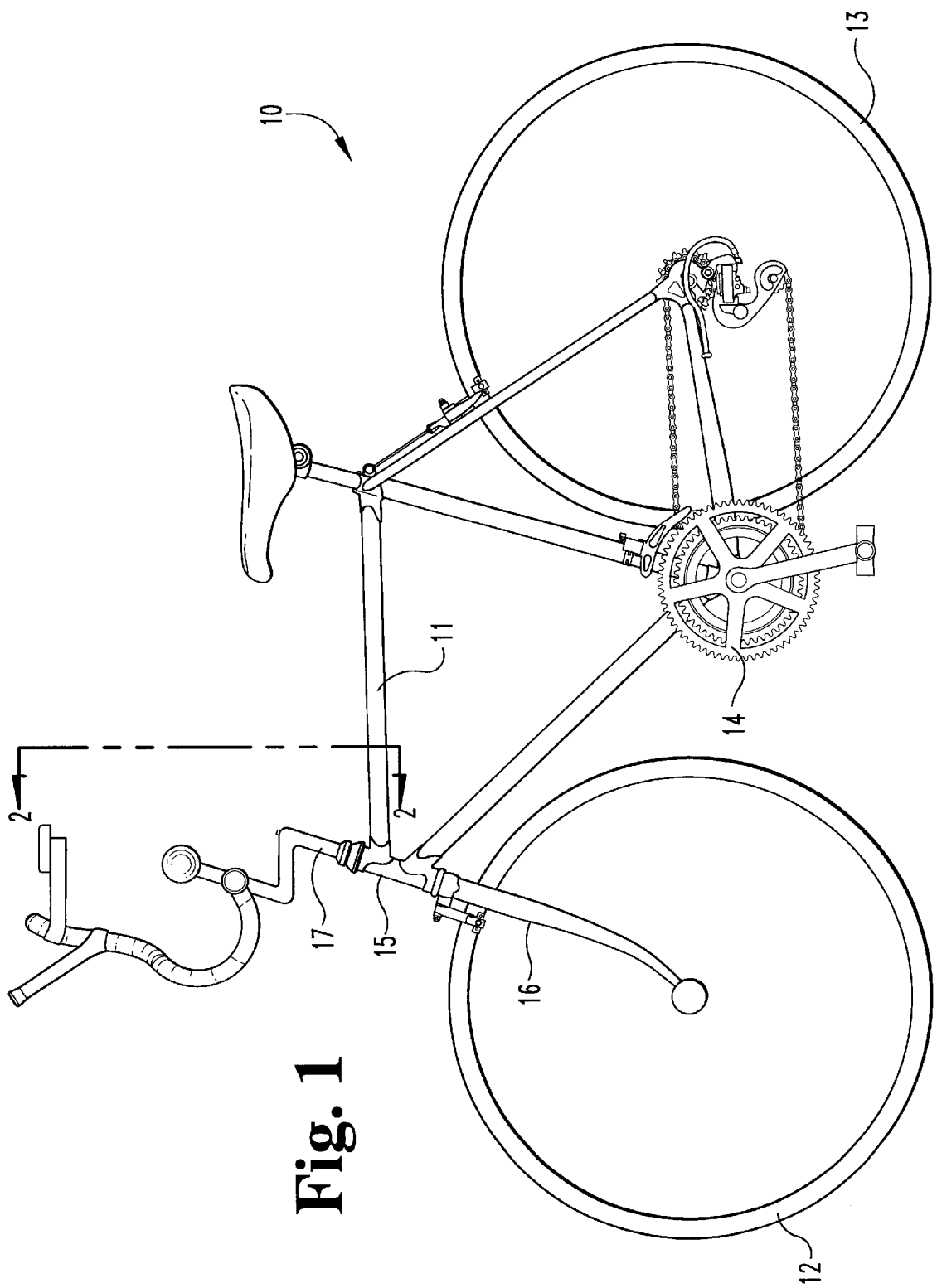
FIG. 1 is a side view of a bicycle incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a conventional road bicycle 10 having a bicycle frame 11 with a front wheel 12 and rear wheel 13 rotatably mounted thereto. A conventional chain sprocket combination 14 is mounted to frame 11 and is engaged with the driving mechanism of the rear wheel 13. The front of the frame includes a cylindrical tube 15 through which the bicycle fork 16 atop of fork 16 extends and is attached to the downwardly extending steering column 17 in the conventional manner.

Figure 2:
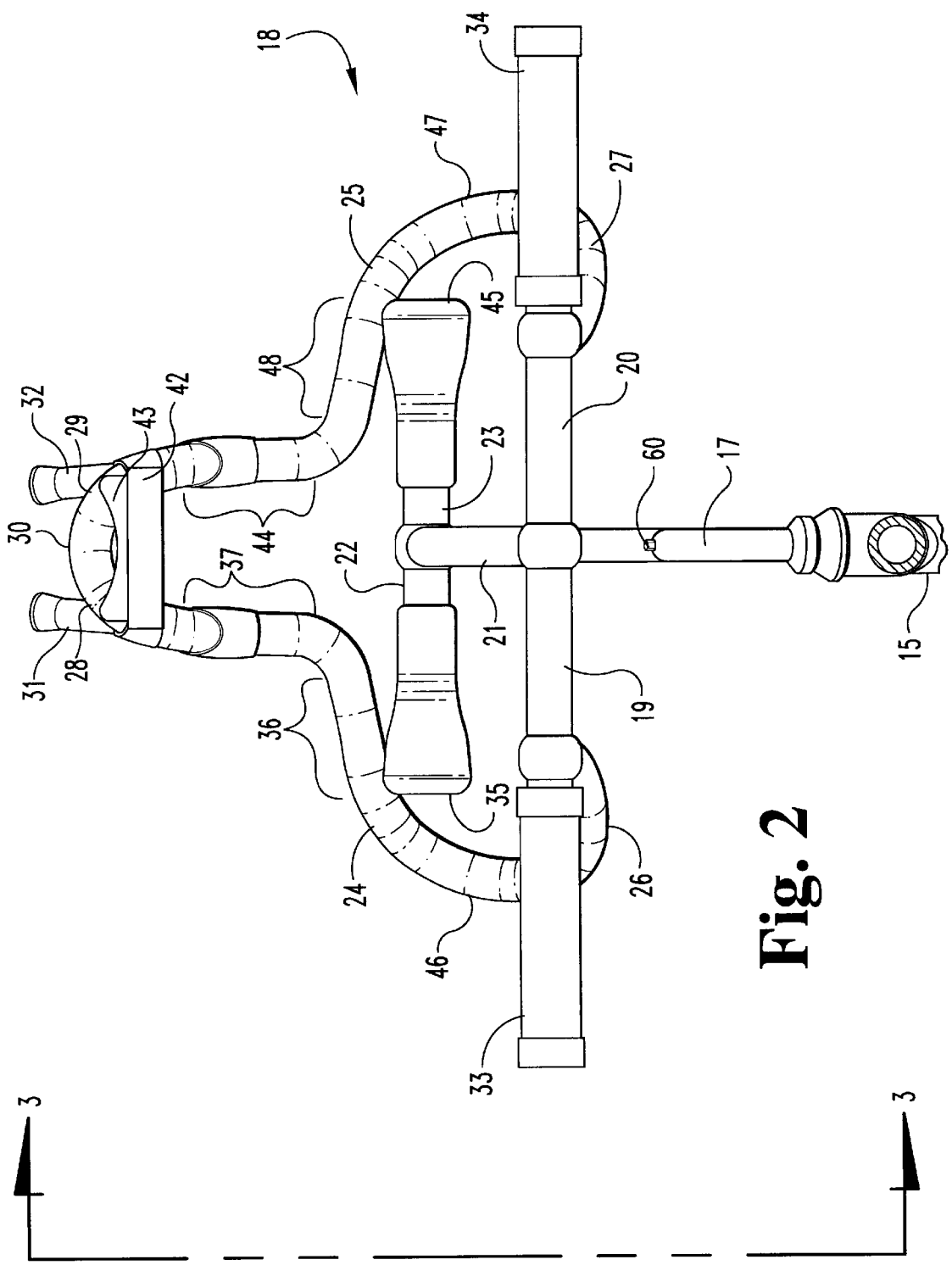
FIG. 2 is a fragmentary view of the handlebars looking in the direction of arrows 2—2 of FIG. 1.

Attached to the top of steering column 17 is the novel handlebar construction 18 (FIG. 2). Construction 18 includes a pair of mutually opposed and oppositely extending horizontal handlebars 19 and 20 integrally attached to the steering column or handlebar mounting stem 17 rotatably mounted to tube 15. Stem 17 extends upwardly from bars 19 and 20 forming a stem extension 21 having a pair of oppositely directed, aligned and horizontally extending bars 22 and 23. Yet a further pair of mutually opposed handlebars 24 and 25 have respectively proximal ends 26 and 27 mounted to bars 19 and 20. The distal end portions 28 and 29 of bars 24 and 25 are integrally connected together and meet at a center portion 30 in line with stem 17. A pair of handles 31 and 32 are attached and project upwardly from respectively distal end portions 28 and 29 of bars 24 and 25. Proximal end portions 26 and 27 may either be integrally attached to bars 19 or 20 or may be fastened thereto by conventional clamping fasteners.

Handlebars 19 and 20 are the conventional handlebars provided on a bicycle. The end portions 33 and 34 may be provided with cushioned grips to grab when mounting the bicycle and for use in tricky or difficult conditions requiring more stability. When distal ends 33 and 34 are gripped, the hands of the bicyclist are located far apart allowing greater control of stem 17 and wheel 12. Handlebars 19 and 20 are particularly useful when negotiating traffic or over difficult rocky terrain.

Handlebar 24 is a mirror image of handlebar 25 and thus the following description of bar 24 will apply equally to bar 25. The proximal end 26 of bar 24 is attached to bar 19 between the distal end 33 of bar 19 and stem 17 and at a location approximately beneath the enlarged outer end 35 of bar 22. Bar 24 extends downwardly from proximal end 26 and then through a gentle curve of approximately 180 degrees, as indicated by arrow 51, to a location approximately equal in elevation to bar 22 at which point bar 24 extends inwardly forming a forearm receiving portion 36. Portion 36 of bar 24 then extends upwardly forming an additional forearm receiving portion 37 to the distal end portion 28 joined to distal end portion 29 of bar 25 at the central portion 30. Forearm receiving portion 36 extends horizontally from slightly outward of end 35 and to a location approximately midway between stem 21 and end 35 with portion 37 then extending upwardly.

Handles 31 and 32 are integrally attached or clamped to end portions 28 and 29 and are aligned with the upwardly extending forearm portions of bars 24 and 25. For example, handle 31 is located approximately in line with portion 37. As a result, the left hand of the bicyclist may grip handle 31 when in a racing position thereby resting the left forearm against portion 37 with the forearm then extending across and in contact with portion 36 thereby positioning the left elbow adjacent and atop bar 22. In this position, the bicyclist bends forward so that both forearms are resting against bars 24 and 25 with the elbows resting against bars 22 and 23.

Head support 40 is cantileverly mounted to center portion 30 of bars 24 and 25 by bracket 41 having one end attached to center portion 30 and the opposite end attached to headrest 40. Headrest 40 has a rectangular shaped block configured main body with a distal end 42 having a foam cushion 43 secured to the upper horizontally extending edge thereof. Cushion 43 is positioned approximately over bars 19, 20, 22, and 23 thereby allowing the bicyclist to rest his or her chin thereon as handles 31 and 32 are gripped with the forearms resting on portions 37 and 44 of bars 24 and 25 and the elbows resting on bars 22 and 23. Head support 40 is thereby located between the arm receiving portions 37 and 44 of bars 24 and 25.

Bars 22 and 23 have external surfaces which are heavily upholstered or padded providing for steady and comfortable riding including the elbows if the hands are in the forward position. The hands forward position lowers wind resistance, permits full extension of the fingers, protects the face and postpones tiredness because the neck and hand muscles can rest and is used on an even riding surface. Distal ends 35 and 45 of bars 22 and 23 are enlarged to prevent the elbows or hands from accidentally slipping off the end thereof. Bars 22 and 23 are located beneath the forearm supporting bars 24 and 25 whereas bars 19 and 20 are located beneath bars 22 and 23 for guiding when in an erect position. The elbow supporting bars 22 and 23 and the handlebars 19 and 20 extend horizontally whereas handles 31 and 32 extend in the same direction as the forearm supporting portions 37 and 44. Portions 37 and 44 extend convergingly inward from portions 46 and 47.

The outwardly curved portions 46 and 47 of bars 24 and 25 extend from bars 19 and 20 to the arm receiving portions 36 and 48 of bars 24 and 25 and thus are positioned therebetween. Portions 46 and 47 may be gripped when the bicyclist is in a position between the forwardly leaning position and an erect position. As a result, curved portions 46 and 47 may be gripped for hill climbing when the bicyclist is either seated or in the standing position to apply maximum force to the pedals. The thumbs and first fingers may apply pressure to portions 36 and 48 with the hands being in a position between supinated and pronated and cocked up. The top side of bars 24 and 25 adjacent to the stem and extending straight to the curve is covered by resilient cushioning material.

Figure 3:
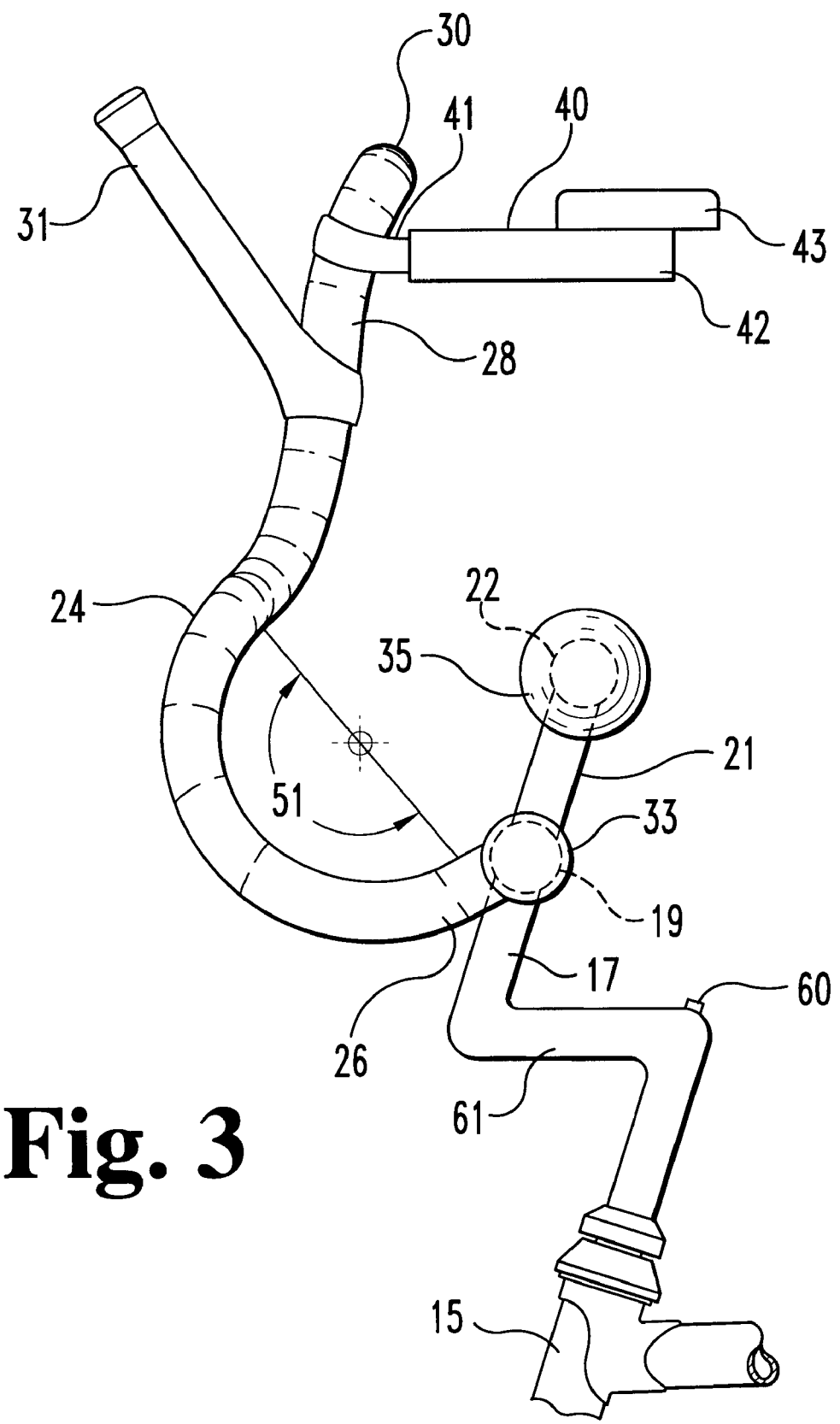
FIG. 3 is a fragmentary view of the handlebars looking in the direction of arrows 3—3 of FIG. 2.

Stem 17 may be mounted to the bicycle in a conventional manner. For example, stem 17 (FIG. 3) may be provided with a right angle bend 61 with a bolt 60 extending downwardly through the stem being threadedly received by an expandable or movable lock which is positioned within the hollow stem of fork 16 extending upwardly through tube 15. By tightening bolt 60, the fastener is caused to grip the inside wall of the stem thereby securing stem 17 to fork 16.

While the invention has been illustrated and described in detail in the drawings and foregoing description, the same is to be considered as illustrative and not restrictive in character, it being understood that only the preferred road bicycle embodiment has been shown and described and that all changes and modifications that come within the spirit of the invention are desired to be protected, such as changes and modifications needed for use on all terrain bicycles.

What is claimed is:

1. A handlebar for a bicycle to support the head, forearms and elbows of a bicyclist comprising:

a handlebar mounting stem mountable to a bicycle;

a first pair of mutually opposed arm supporting bars mounted to said stem, said bars each including arm receiving portions which extend upwardly to receive the forearms of a bicyclist when in a forward leaning position;

a second pair of primary elbow supporting bars mounted to said stem and located beneath said arm supporting bars to receive the elbows of the bicyclist; and, a third pair of handlebars located beneath said elbow-supporting bars and mounted to said stem for guiding when in an erect position, said second pair of primary elbow supporting bars and said third pair of handlebars being mounted independently of each other directly to said stem, said first pair of mutually opposed arm supporting bars including curved portions located lower than said third pair of handlebars and closer thereto than said arm receiving portions for gripping when in a hill climbing position between a forward leaning position and an erect position, said curved portions extending downwardly and outwardly from said third pair of handlebars and then upwardly and inwardly to said arm receiving portions.

2. A handlebar for a bicycle to support the head, forearms and elbows of a bicyclist comprising:

a handlebar mounting stem mountable to a bicycle;

a first pair of mutually opposed arm supporting bars mounted to said stem, said bars each including arm receiving portions which extend upwardly to receive the forearms of a bicyclist when in a forward leaning position;

a second pair of primary elbow supporting bars mounted to said stem and located beneath said arm supporting bars to receive the elbows of the bicyclist;

a third pair of handlebars located beneath said elbow-supporting bars and mounted to said stem for guiding when in an erect position; and, a head support mounted to and located between said arm receiving portions, said head support extends rearward toward the bicyclist and has a padded upper chin receiving edge.

3. A handlebar for a bicycle to support the head, forearms and elbows of a bicyclist comprising:

a handlebar mounting stem mountable to a bicycle;

a first pair of mutually opposed arm supporting bars mounted to said stem, said bars each including arm receiving portions which extend upwardly to receive the forearms of a bicyclist when in a forward leaning position;

a second pair of primary elbow supporting bars mounted to said stem and located beneath said arm supporting bars to receive the elbows of the bicyclist;

a third pair of handlebars located beneath said elbow-supporting bars and mounted to said stem for guiding when in an erect position;

a head support located between said arm receiving portions, said head support extends rearward toward the bicyclist and has a padded upper chin receiving edge; and, a pair of handles mounted to and located above said arm receiving portions for gripping as the bicyclist leans forward with the head, forearms, and elbows resting respectively against said head support, said elbow supporting bars, and said arm receiving portions.

4. The handlebar of claim 3 wherein:

said third pair of handlebars have opposite distal ends and extend outwardly of said arm receiving portions, said third pair of handles are straight between said distal ends for maximizing stability.

5. The handlebar of claim 4 wherein:

said arm supporting bars each include a pair of forwardly extending curved portions located between said third pair of handlebars and said arm receiving portions for gripping.

6. A handlebar for a bicycle to support the head, forearms and elbows of a bicyclist comprising:

a handlebar mounting stem mountable to a bicycle;

a first pair of mutually opposed arm supporting bars mounted to said stem, said bars each including arm receiving portions which extend upwardly to receive the forearms of a bicyclist when in a forward leaning position;

a second pair of primary elbow supporting bars mounted to said stem and located beneath said arm supporting bars to receive the elbows of the bicyclist;

a third pair of handlebars located beneath said elbow-supporting bars and mounted to said stem for guiding when in an erect position;

a head support located between said arm receiving portions; and, a pair of handles mounted to said stem and located above said arm receiving portions for gripping as the bicyclist leans forward with the head, forearms, and elbows resting respectively against said head support, said elbow supporting bars, and said arm receiving portions; and wherein:

said third pair of handlebars extend outwardly of said arm receiving portions, said arm supporting bars each include a pair of forwardly extending curved portions located between said third pair of handlebars and said arm receiving portions for gripping, said head support is mounted to said arm-supporting bars and extends rearward toward the bicyclist, said head support has a padded upper chin receiving edge.

7. The handlebar of claim 6 wherein:

said pair of forwardly extending curved portions each extend from said third pair of handle bars through an approximate 180 degree curve to said arm receiving portions, said arm receiving portions extend convergingly inwardly from said forwardly extending curved portions and then upwardly forming a pair of forearm supports.

8. The handlebar of claim 7 wherein:

said second pair and said third pair extend horizontally whereas said handles are aligned to extend in the same direction as said forearm supports.

9. The handlebar of claim 8 wherein:

said arm receiving portions have distal end portions joined together with said head support mounted to said distal end portions.

10. The handlebar of claim 9 wherein:

said elbow supporting bars include enlarged distal ends to limit movement of the elbows.

11. The handlebar of claim 6 wherein:

said arm supporting bars and said handlebars are of a single unit construction.

12. A handlebar construction for a bicycle comprising:

a handlebar mounting stem mountable to a bicycle;

a first pair of mutually opposed arm supporting bars mounted to said stem, said bars each including arm receiving portions which extend upwardly to receive the forearms of a bicyclist when in a forward leaning position;

a head support located between said arm receiving portions, said head support extends rearward toward the bicyclist and has a padded upper chin receiving edge;

a second pair of primary elbow supporting bars mounted to said stem and located beneath said arm-supporting bars to receive the elbows of the bicyclist; and, a pair of handles mounted to said stem and located above said arm receiving portions for gripping as the bicyclist leans forward with the head, forearms, and elbows resting respectively against said head support, said elbow supporting bars, and said arm receiving portions; and, wherein:

said handles are mounted to said arm supporting bars.

13. The handlebar of claim 12 and further comprising a third pair of handlebars and wherein:

said arm supporting bars each include a pair of forwardly extending curved portions located between said third pair of handle bars and said arm receiving portions for gripping.

14. A handlebar construction for a bicycle comprising:

a first pair of mutually opposed arm supporting bars, said bars each including arm receiving portions which extend upwardly to receive the forearms of a bicyclist when in a forward leaning position;

a second pair of primary elbow supporting bars connected to said arm supporting bars and located beneath said arm supporting bars to receive the elbows of the bicyclist; and, a third pair of handlebars for guiding when in an erect position, said second pair of primary elbow supporting bars and said third pair of handlebars being mounted independently of each other, said first pair of mutually opposed arm supporting bars including curved portions located lower than said third pair of handlebars and closer thereto than said arm receiving portions for gripping when in a hill climbing position between a forward leaning position and an erect position, said curved portion extending downwardly and outwardly from said third pair of handlebars and then upwardly and inwardly to said arm receiving portions.

15. A handlebar construction for a bicycle comprising:

a first pair of mutually opposed arm supporting bars, said bars each including arm receiving portions which extend upwardly to receive the forearms of a bicyclist when in a forward leaning position;

a head support located between said arm supporting bars, said head support extends rearward toward the bicyclist and has a padded upper chin receiving edge;

a second pair of primary elbow supporting bars connected to said arm supporting bars and located beneath said arm supporting bars to receive the elbows of the bicyclist;

a third pair of handlebars for guiding when in an erect position; and, a pair of handles mounted to and located above said arm receiving portions for gripping as the bicyclist leans forward with the forearms, and elbows resting respectively against said elbow supporting bars, and said arm receiving portions.

16. The handlebar of claim 15 wherein:

said third pair of handlebars extend outwardly of said arm receiving portions.

17. The handlebar of claim 16 wherein:

said arm supporting bars each include a pair of forwardly extending curved portions located between said third pair of handlebars and said arm receiving portions for gripping.

* * * * *